April 7, 1964    E. C. PROCTER ETAL    3,127,723
ROW CROP FORAGE HARVESTER AND CROP FEED MEANS
Filed March 24, 1961    3 Sheets-Sheet 1
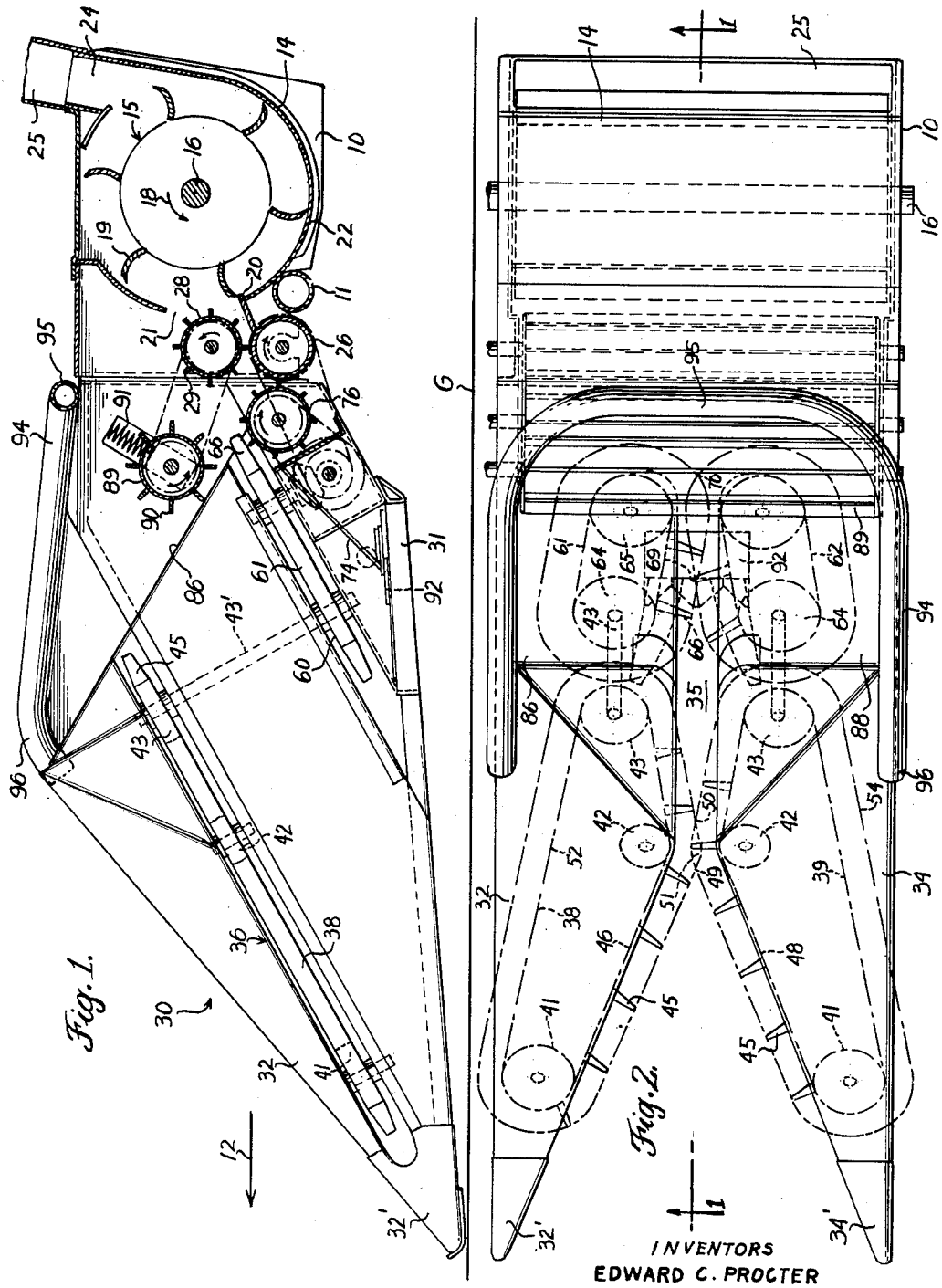
INVENTORS
EDWARD C. PROCTER
ALLISON W. BLANSHINE
ROBERT E. WALLIN
BY Joseph A. Brown
ATTORNEY April 7, 1964     E. C. PROCTER ETAL     3,127,723
ROW CROP FORAGE HARVESTER AND CROP FEED MEANS
Filed March 24, 1961     3 Sheets-Sheet 2
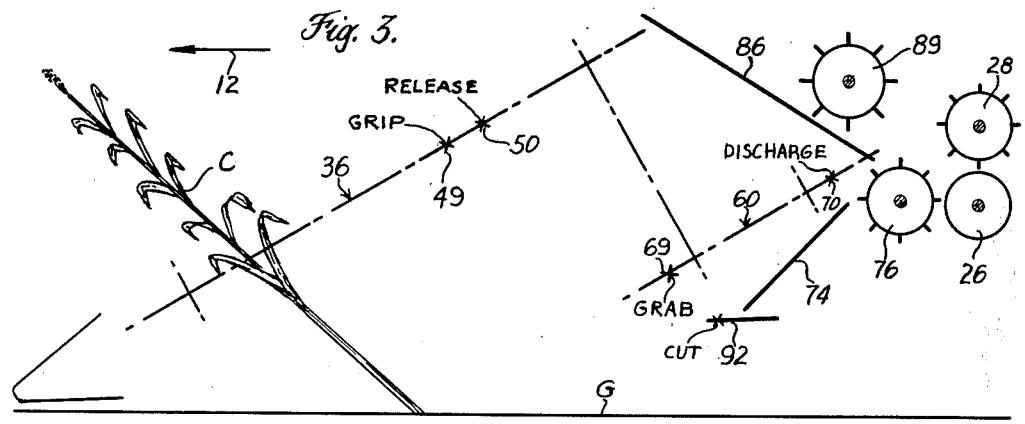
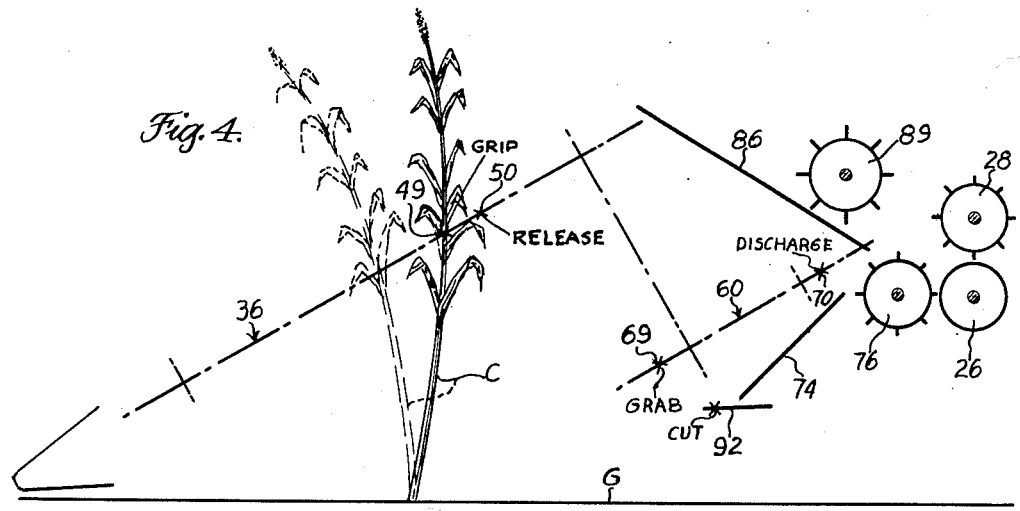
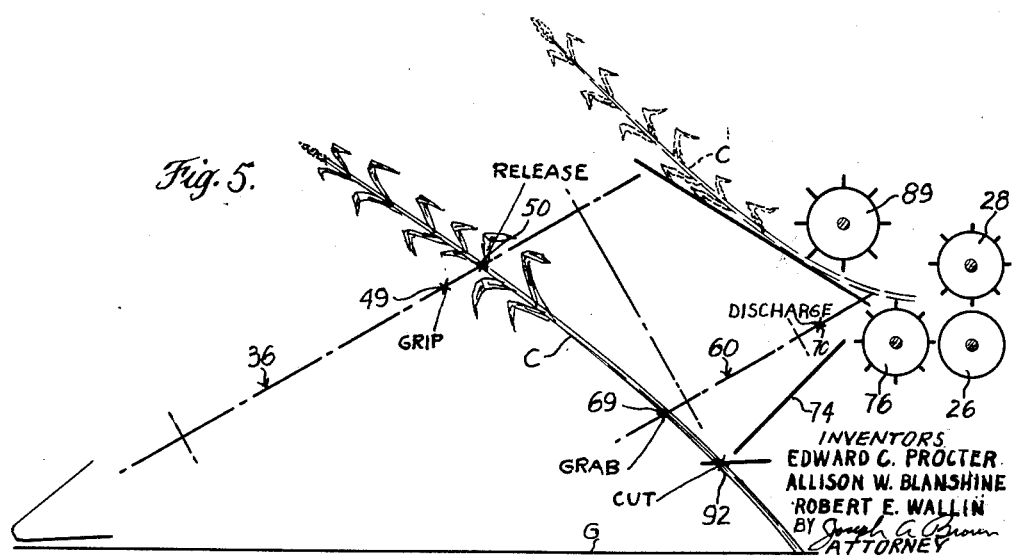
INVENTORS
EDWARD C. PROCTER
ALLISON W. BLANSHINE
ROBERT E. WALLIN
BY
ATTORNEY

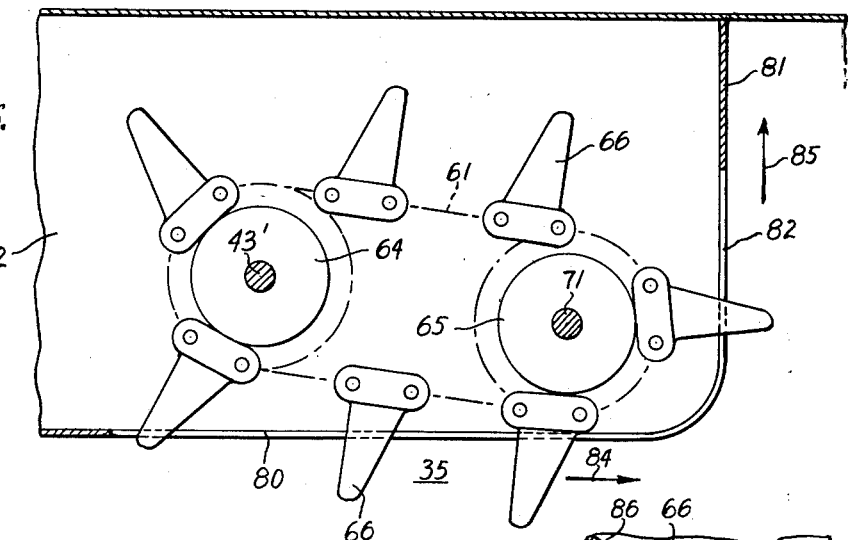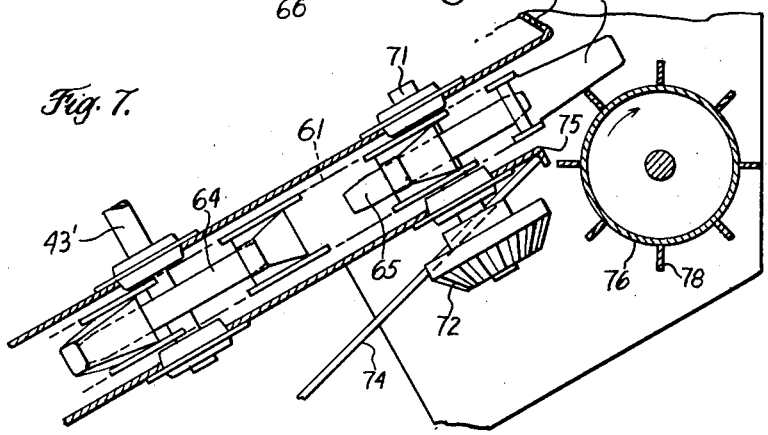

United States Patent Office 3,127,723
Patented Apr. 7, 1964

3,127,723
ROW CROP FORAGE HARVESTER AND CROP
FEED MEANS
Edward C. Procter, New Holland, Allison W. Blanshine, Lititz, and Robert E. Wallin, New Holland, Pa., assignors to Sperry Rand Corporation, New Holland, Pa., a corporation of Delaware
Filed Mar. 24, 1961, Ser. No. 98,122
5 Claims. (Cl. 56—16)

A conventional row crop corn attachment for a forage harvester has a pair of dividers which pass on either side of standing corn as the harvester travels forwardly. A forward set of gathering chains, one on each divider, operates to grip the standing corn and convey it rearwardly. The gathering chains extend at an upward and rearward direction. After the corn is gripped by the forward gathering chains and before it is released, the corn is severed from the ground and a rearward set of gathering chains catch hold of the corn and operate with the forward set to deliver the corn at a proper angle into an infeed and chopping mechanism. Usually, the corn is fed into the infeed and chopping mechanism butt end first. The rearward set of gathering chains extends generally parallel to the forward set.

The forward gathering chains convey the corn rearwardly and exert a hold thereon over a substantial distance. It is essential therefore, that the speed of operation of these chains be timed with the ground speed of the harvester. If the harvester travels too fast for chain speeds, the corn will be knocked down. If the harvester speed is too slow relative to chain speeds, the chains will flip the corn rearwardly thereby disrupting the infeed action and impairing the operation of the machine. Generally, when the top of the corn has been thrown upwardly and rearwardly, the machine will plug and will not feed the corn into the chopping mechanism. Therefore, with a conventional row crop attachment for a forage harvester, the forward gathering chains must operate at a linear or gathering speed which is the same as the ground speed of the harvester. If the harvester is to be operated at three miles per hour, then the gathering chains must gather at the same speed.

Once the ground speed of the harvester and the speed of the gathering chains have been established, it is undesirable to vary ground speed. The harvester should be operated at a fixed speed and this creates problems. In places where the corn growth is light, only a portion of the harvester capacity is used if the ground speed of the harvester is too slow. In other places where corn growth is lush, the fixed ground speed may be too fast, causing plugging of the machine. It is preferable to operate the harvester at a ground speed related to variable conditions, so that when the crop is light the harvester can be operated at a high ground speed and when the crop is very heavy, the harvester can be operated at a low ground speed. However, this can not be accomplished with a conventional harvester because of the required fixed ground speed-gathering chain speed relationship.

A main object of this invention is to provide a corn attachment for a forage harvester wherein the ground speed of the harvester may be varied as desired within a given range without adversely affecting the infeed action of the attachment.

Another object of this invention is to provide a corn attachment that has a high infeed capacity which can be utilized to the maximum by varying the ground speed of the harvester to take into account crop conditions at any given moment when the corn is being harvested.

Another object of this invention is to provide a corn attachment of the character described wherein the corn is fed butt end first through an infeed mechanism, means being provided to prevent escape of the corn once it has been gripped by the attachment.

A further object of this invention is to provide a corn attachment of the character described wherein means is provided for positively stripping the corn stalks and any weeds or the like which may be attached to the gathering chains of the attachment to facilitate the infeeding of corn to the chopper thereof.

A still further object of this invention is to provide a corn attachment of the character described wherein the corn is distributed laterally on both sides of an inlet by the harvester mechanism and then fed rearwardly in a horizontal ribbon to a chopper.

Other objects of this invention will be apparent hereinafter from the specification and from the recital in the appended claims.

In the drawings:

FIG. 1 is a part side elevation, part vertical section through a forage harvester attachment constructed according to this invention and taken generally on the line 1—1 of FIG. 2 looking in the direction of the arrows;

FIG. 2 is a plan view of FIG. 1;

FIGS. 3–5 are diagrammatic views illustrating the operative relationship of the components of the corn attachment and showing the successive movements of a corn stalk into the harvester;

FIG. 6 is an enlarged plan view showing one of the gathering chains of the second gathering chain unit of the attachment; and FIG. 7 is an enlarged fragmentary view showing the stripper roll used in conjunction with the second gathering chain unit to remove crop and other material therefrom.

Referring now to the drawings by numerals of reference (particularly FIGS. 1, 2, 6 and 7) 10 denotes a forage harvester base unit carried on a frame 11 for ground movement forwardly indicated by the arrow 12 in FIG. 1. It is intended that the harvester be either self-propelled or towed by a tractor and operated at a ground speed variable within a given range such as two to four miles per hour. Base unit 10 comprises a housing 14 in which a rotary cutter 15 is operable. Cutter 15 has a transverse shaft 16 rotatable in the direction indicated by the arrow 18, FIG. 1. A plurality of radially extending angularly spaced knives 19 are provided which on rotation of the cutter move past a stationary shear bar 20 to chop and throw crop material fed into the housing 14. The material enters through a forwardly directed inlet opening 21. After the crop material is severed, it is swept along the arcuate bottom portion 22 of housing 14 and thrown upwardly and outwardly through discharge opening 24. The material travels through a discharge spout 25 to a trailing wagon or the like which receives the material.

The crop material fed through forward opening 21 in base unit 10 comes from between a pair of cooperative infeed rolls, namely lower roll 26 and upper roll 28. The lower roll 26 is cylindrical and rotates in a clockwise direction when viewed as shown in FIG. 1. The upper roll 28 rotates in the opposite direction or counterclockwise and has transverse slats 29 which are preferably serrated to provide an aggressive infeed action on the material fed toward the opening 21.

Mounted in front of the base unit 10 is a row crop attachment 30 constructed according to this invention. Attachment 30 comprises a frame structure 31 on which a pair of divider members 32 and 34 are mounted. The dividers 32 and 34 are generally triangular in configuration when viewed in plan, FIG. 2, being widely spaced apart at their forward ends 32'—34' and converging as they extend rearwardly to a point where they extend parallel to each other to provide a fore-and-aft extending inlet or passage 35. When the harvester travels forwardly, the dividers 32 and 34 pass on opposite sides of standing corn and the corn moves into the passage 35 for feeding into the base unit 10 through the opening 21.

To provide for proper infeed of the corn, a first gathering means or unit 36 is mounted on the forward end of frame 31. The first gathering means comprises a pair of cooperative gathering elements or chains 38 and 39, the chain 38 being operative in divider 32 and the chain 39 in divider 34. Each chain passes over three sprockets 41, 42 and 43. The chains have outwardly extending gathering fingers 45 which are projectable through suitable slots in dividers 32 and 34. Chains 38 and 39 have infeed reaches 46 and 48, respectively, which converge rearwardly and cross at a grip point 49, FIG. 2. The reaches overlap for a short distance and then diverge, crossing again at a release point 50. As a result of this crossing of the infeed reaches of the gathering chains, an overlapping section 51 of very short fore-and-aft extension is provided.

As shown in FIG. 1, the forward gathering chain means 36 extends upwardly and rearwardly relative to the direction of travel of the harvester. When viewed in plan, the gathering chain 38 moves in a counterclockwise direction while the gathering chain 39 moves clockwise. The fingers 45 on the chains are so arranged that they successively pass across the overlapping section 51. A finger on chain 38 passes the section and then a finger on the chain 39, and so on. After the infeed reaches of the gathering chains diverge at release point 50, they travel along the return reaches 52 and 54 respectively and back to starting position. The drive for the gathering chains is through shafts 43' to sprockets 43 and may be from any suitable source of power, not shown. However, infeed reaches 46 and 48 of the gathering chains must travel at a linear speed at least as fast as the fastest ground speed of the harvester.

Attachment 30 has a second gathering chain means or unit 60 located on frame 31 rearwardly of first gathering chain unit 36. Unit 60 comprises a pair of gathering elements or chains 61 and 62 which travel around sprockets 64 and 65. Chain 61 operates in divider 32 and chain 62 in divider 34. The chains rotate in opposite directions and have fingers 66 which are projected outwardly of the dividers and cooperate to exert an infeed action on engaged crop material. As will be noted, unit 60 extends parallel to unit 36 and the operative length of unit 60 is less than half the operative length of unit 36. The gathering chains of unit 60 cross at a grab point 69 near the rearward end of passage 35. They are coextensive to a discharge point 70 where they diverge and separate. The rear sprockets 65 of the gathering chains 61 and 62 each have a shaft 71 (FIG. 7) which projects downwardly and has a drive pinion 72 connected thereto adapted to receive power from a source not shown. The sprockets 64 are connected to the lower ends of shafts 43' to thereby transmit power to the forward gathering unit. The sprocket ratio is such that the second gathering unit is operated at a speed faster than the speed of operation of the first gathering unit.

Located beneath second gathering chain unit 60, is a trough or pan 74 which is inclined upwardly and rearwardly. Trough 74 forms an inclined ramp over which the crop material may slide. The upper rearward end 75 of the ramp 74 is proximate to a stripper roll 76, shown best in FIG. 7, having peripheral slats 78 which engage the material as it comes from the ramp 74 and feeds it toward infeed rolls 26 and 28. Roll 76 is so disposed that slats 78 wipe over the fingers 66 on gathering chains 61 and 62 to thereby strip crop material, weeds and other material therefrom and feed it to the infeed rolls 26 and 28.

Gathering chains 61 and 62 project outwardly through fore-and-aft elongate spaces 80 beneath dividers 32 and 34 (FIG. 6) whereby they engage the corn in passage 35. Each divider extends rearwardly along passage 35 and then laterally outwardly along a portion 81 opened at 82. Corn is first fed rearwardly by fingers 66 as indicated by the arrow 84 in FIG. 6 and then spread laterally in the direction indicated by the arrow 85. The gathering chain 61 operates to spread material towards one side of the infeed passage 35 while the gathering chain 62 operates to spread the material to the opposite side of the passage 35. Thus, a horizontal ribbon of corn is formed which may be readily fed between rolls 26 and 28 and into chopper housing 14.

The dividers 32 and 34 are provided with forwardly and upwardly inclined rear tables 86 and 88, respectively, to support the corn which has been spread laterally. Operative above tables 86 and 88 and passage 35 is an infeed roll 89, as shown in FIG. 1, having serrated slats 90 which sweep over passage 35 and across the surfaces of tables 86 and 88. Being located above the release area of second gathering unit 60, roll 89 prevents the corn from tipping upwardly and escaping from the attachment after it has been released by unit 60 and before it is engaged by infeed rolls 26 and 28. The infeed roll 89 extends substantially all the way across the tables 86 and 88 and upon counterclockwise rotation exerts a downward, rearward force on the crop material. If an overload condition arises, roll 89 is adapted to move upwardly and away from tables 86 and 88 against the resistance of spring means 91.

It is seen therefore that roll 76, with the slats 78 thereon, exerts a stripping and infeed action on the material coming from the second gathering unit 60 while the upper infeed roll 89 operates to exert a downward and rearward aggressive feeding action on the crop material and prevent it from escaping from the harvester.

To sever the crop material from the ground G, a sickle 92 is provided and mounted on frame 31 beneath the lower forward end of gathering unit 60. Sickle 92 extends across the infeed passage 35 adjacent the bottom thereof. Conventional reciprocable knife elements are provided to sever the standing crop. The mechanism is driven from a source of power not shown.

Mounted on top of the rear portions of dividers 32 and 34 is a guide tube 94 which is U-shaped in plan view. Tube 94 has a bight portion 95 located rearwardly of infeed roll 89 and side arms 96 which extend forwardly along the outsides of the dividers. As shown in FIG. 1, the bight portion 95 is at a lower elevation than the forward ends of side arms 96.

The operation of attachment 30 can be best understood from FIGS. 3–5. When the harvester travels forwardly, as indicated by the arrow 12 in FIG. 3, the gathering chains of the first gathering unit 36 cooperate to grip the corn C at grip point 49. Point 49 is the forward location where the infeed reaches 46 and 48 of the gathering chains cross. The corn is positively conveyed rearwardly by chains 38 and 39 across the section 51 thereof where the fingers 45 overlap, being released at the point 50 where the gathering chains diverge. Thus, as shown in FIG. 1 and indicated in FIGS. 3–5, the crop material is released only a short distance after a gripping takes place. The linear speed of infeed reaches 46 and 48 of the gathering chains is at least as fast and usually faster than the ground speed of the harvester. For example, the harvester may be traveling forwardly at three miles an hour while the forward gathering chains are traveling at four and one-half miles an hour. As a result, if the corn C is extending downwardly and forwardly, the rapid travel of the gathering chains will pull the corn to an erect position as shown in FIG. 4 and then quickly release it. If the corn is erect, it stays that way since a release takes place so quickly after the gripping action occurs. Subsequent to the time that the corn is released at the point 50, it is grabbed by the second gathering unit 60 at the forward point 69 where the endless chains 61 and 62 cross. Proximate to the time of gathering the corn by the second gathering unit, the sickle 92 operates to cut the corn from the ground so that the stalk, with its foliage and ears, may be fed into the harvester. The gathering chains 61 and 62 operate at a linear speed faster than ground speed and faster than the speed of the infeed reaches of gathering chains 38 and 39 of the first gathering unit. For example, these chains may travel at five miles per hour. Since the second gathering chain unit 60 operates faster than the first gathering chain unit 36, chains 64 and 65 pivot the corn about the release point 50 so that the butt ends of the corn stalks are swung upwardly and rearwardly and toward the infeed roll 89. This insures that the corn will be fed butt end first into the feed rolls 26 and 28. Thus, the corn is first gripped, then released, then grabbed and cut, and finally pivoted about the release point to swing the butt end towards the infeed of the harvester.

With this arrangement, the ground speed of the harvester and the gathering speed of unit 36 does not have to be the same. The operator can run the harvester at any ground speed up to the speed of the first gathering means. Even though unit 36 operates faster than ground speed, the chains do not tend to throw the corn over the top of the harvester. This is because the corn is released so quickly after it is gripped. The relationship of the grip, release, grab and cut of the harvester renders the structure properly operative regardless of variations in ground speed. Thus, the operator can run the harvester at a slow speed, such as two miles an hour, when the crop is lush and at a relatively fast speed, such as four or four and a half miles per hour, when the crop is thin. As a result, maximum output can be obtained with the harvester relative to prevailing harvesting conditions.

The infeed roll 89 prevents the butt ends of the corn from swinging upwardly and out of the harvester when the corn is pivoted in a counterclockwise direction by the second gathering means 60. Further, as the corn slides along the ramp 74, it is engaged by the stripping roll 76 which strips it off the discharge end 75 of ramp 74. Since the ribs 78 of the stripper roll 76 slide over the fingers 66 on the second gathering chains, a positive stripping action is exerted to remove the corn therefrom, as well as weeds or other material which may tend to cling on the gathering fingers 66. The lateral distribution of the corn to each side of infeed passage 35 places the corn in a horizontal ribbon for infeed into the harvester chopper. This provides for a maximum amount of capacity with a minimum amount of power.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A row crop forage harvester adapted to travel forwardly at a ground speed variable within a given range comprising, in combination, a frame, a pair of laterally spaced dividers mounted on said frame and defining a fore-and-aft inlet opened forwardly to receive crop material standing in a row, a first gathering means forwardly supported on said frame and engageable with material in said inlet, said first gathering means comprising a pair of upwardly and rearwardly extending endless gathering elements operative on opposite sides respectively of said inlet, said gathering elements having infeed reaches travelling rearwardly and converging inwardly to a grip point where their paths of travel meet and located generally at said row, then extending side by side for a relatively short conveying distance, and then diverging outwardly and separating at a rearward release point, means operating said first gathering means at a speed approximately at least as fast as the highest ground speed of said given range, a second gathering means supported on said frame rearwardly of said first gathering means, said second gathering means comprising one pair only of upwardly and rearwardly extending gathering elements operative on opposite sides respectively of said inlet and at least one of said gathering elements being endless and having an infeed reach which travels rearwardly, said second gathering means having a lower forward crop grabbing end and an upper rearward discharge end, a crop supporting ramp beneath and coextensive with said second gathering means, an infeed roll above and rearwardly of said second gathering means discharge end and a stripping roll rearwardly of the end, said infeed and stripping rolls being carried in parallel relation on said frame to extend across said inlet and relatively vertically spaced to define a passage for the crop, said forward end of said second gathering means being rearwardly of said release point whereby the crop is free of gathering means subsequent to release by the first gathering means and prior to being grabbed by the second gathering means, said passage between said infeed and stripping rolls being at a lower level than said release point, cutting means supported on said frame and operable to sever the standing crop from the ground at a point proximate to the grabbing of the crop by said second gathering means, and power means operating said second gathering means at a speed faster than the speed of said first gathering means whereby the ground end of the standing crop is swung upwardly and rearwardly and pivoted about said release point to be fed rearwardly butt end first through said passage between said infeed and stripping rolls.

2. A row crop forage harvester as recited in claim 1 wherein the endless elements of said first and second gathering means comprise chains, and said second gathering means extending generally parallel to and being substantially shorter in length than said first gathering means.

3. A row crop forage harvester as recited in claim 1 wherein said one endless gathering element of said second gathering means has gathering fingers, each of which has a free outer end, said stripping roll being located to sweep directly across the finger free ends to positively wipe material therefrom, the clearance between the roll and the fingers being only operating clearance.

4. A row crop forage harvester as recited in claim 3 wherein an inclined table is provided at each side of said inlet, each table extending from a forward upper end to a rearward lower end beneath said infeed roll, the gathering fingers of said second gathering means distributing material laterally over each table.

5. A row crop forage harvester as recited in claim 4 wherein said infeed roll rotates over each table and is vertically shiftable from a lower position in direct sweeping relation to the surface of each table to an elevated position spaced relative thereto.

References Cited in the file of this patent

UNITED STATES PATENTS

| | | |
|---|---|---|
| 1,726,043 | Scranton | Aug. 27, 1929 |
| 2,348,634 | McEachern | May 9, 1944 |
| 2,442,520 | Van Sickle | June 1, 1948 |
| 2,518,732 | Tuft | Aug. 15, 1950 |
| 2,636,329 | Everett et al. | Apr. 28, 1953 |